G. C. GOODYEAR.
BELT TIGHTENER.
APPLICATION FILED APR. 29, 1915.
1,194,010.
Patented Aug. 8, 1916.
2 SHEETS—SHEET 2.
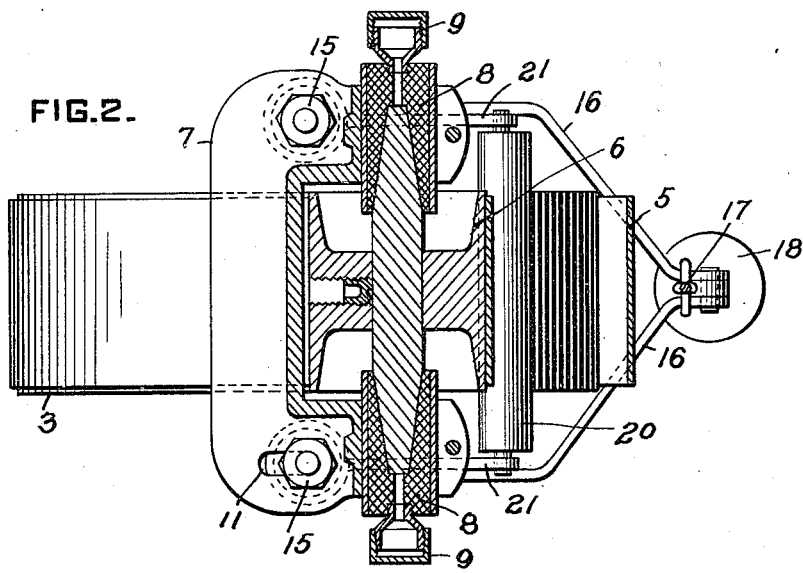
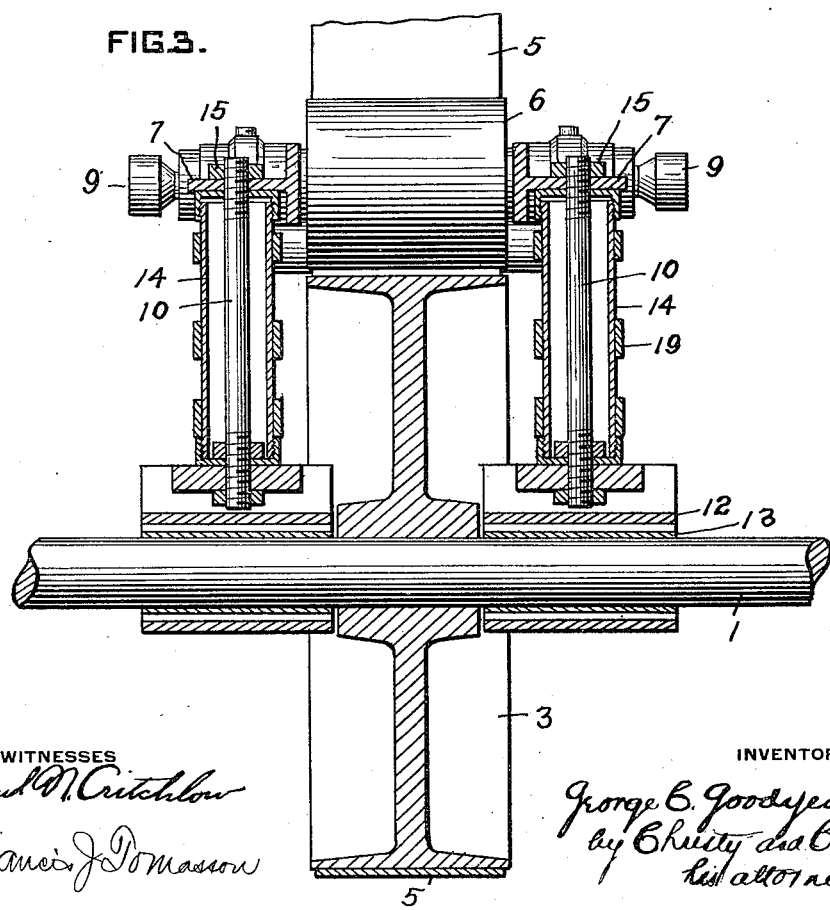

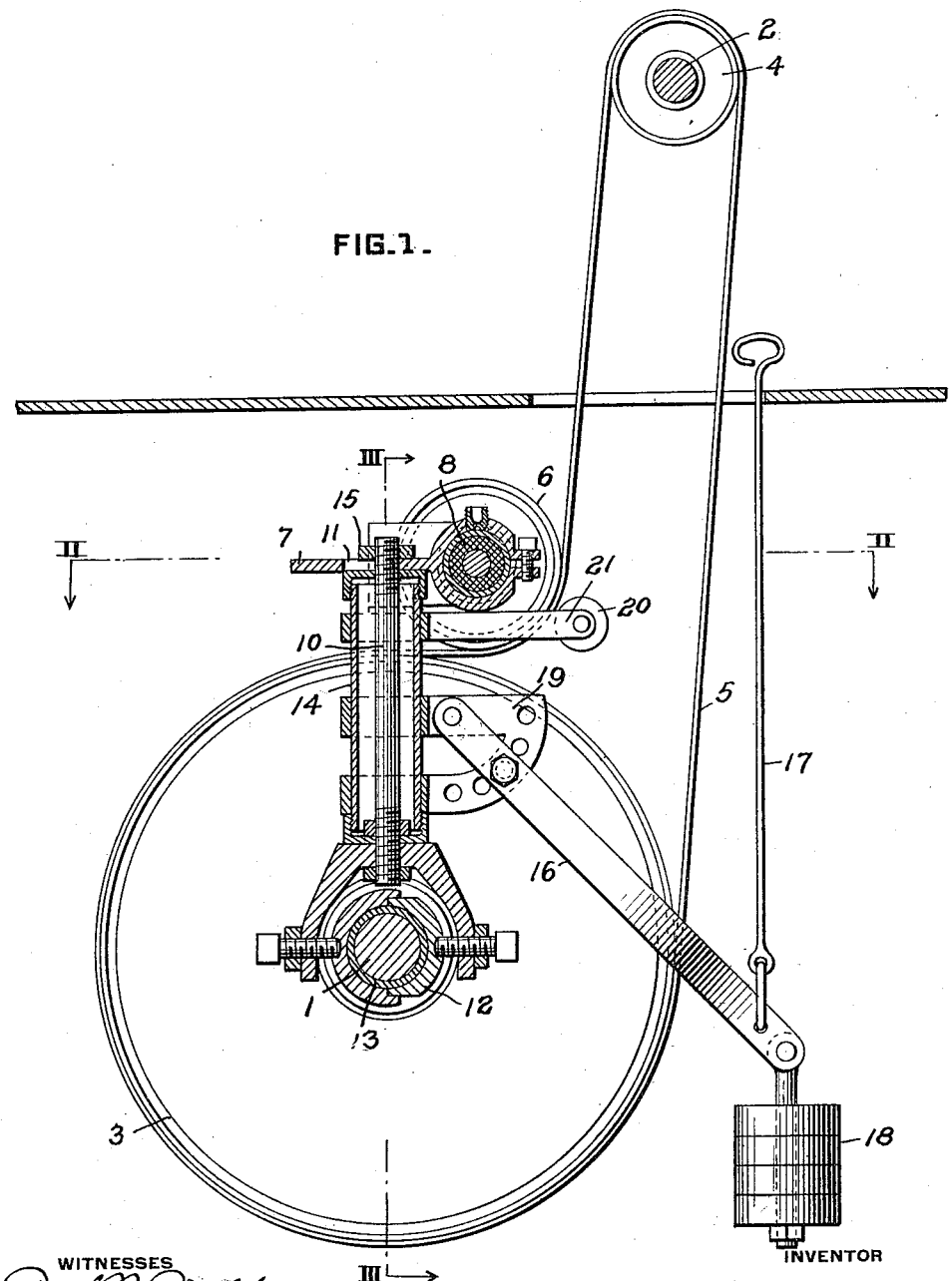

UNITED STATES PATENT OFFICE.

GEORGE C. GOODYEAR, OF McKEES ROCKS, PENNSYLVANIA, ASSIGNOR OF ONE-HALF TO WILLIAM L. RUSSELL, OF PITTSBURGH, PENNSYLVANIA.

BELT-TIGHTENER.

1,194,010. Specification of Letters Patent. Patented Aug. 8, 1916.

Application filed April 29, 1915. Serial No. 24,669.

*To all whom it may concern:*

Be it known that I, GEORGE C. GOODYEAR, residing at McKees Rocks, in the county of Allegheny and State of Pennsylvania, a citizen of the United States, have invented or discovered certain new and useful Improvements in Belt-Tighteners, of which improvements the following is a specification.

My invention relates to improvements in belt-tighteners.

The characteristic features of the belt-tightener of my invention are, first, that it may be applied to and supported upon the shaft of the pulley which carries the belt to be tightened; second, that it is applicable to such a shaft, without the necessity of removing the pulley; third, that it may be fitted to shafts of different size; fourth, that the shaft-engaging parts are adjustable, removable, and replaceable; fifth, that the belt-engaging member is minutely adjustable in its engagement with the belt; sixth, that as a whole it is adaptable to the particular shop environment in which it may be placed; and, seventh, that the construction is simple, well adapted to easy working, durable, and in all parts accessible for ready repair and replacement. Though the presence of all of these features is not requisite to the enjoyment of my invention, they all may be enjoyed, as will be herein explained.

In the accompanying drawings, Figure 1 is a view in vertical section of the belt-tightener of my invention applied in service; Fig. 2 is a horizontal section of the same structure, the plane of section being indicated by the line II—II, Fig. 1, and Fig. 3 is a vertical section, taken at right angles to Fig. 1, on the line III—III, Fig. 1.

1 is a driving shaft and 2 a driven shaft; shaft 1 carries a belt pulley 3 and shaft 2 a belt pulley 4; the belt 5 engages the two pulleys and through them receives and imparts power from shaft 1 to shaft 2.

The belt tightener consists essentially of a belt engaging abutment, in the form of an idler roller suitably carried and movable to and from belt-tightening position. This idler 6 is journaled in a frame 7. As best shown in Fig. 2 the axle of this idler is preferably provided with tapered ends and is supported in bearing blocks 8 which have corresponding conical seats. These bearing blocks, as shown, inclose the ends of the axle of the idler and are provided with lubricator cups 9, from which ducts lead to the bearing surfaces. The bearing blocks are properly secured in the frame 7, as is most clearly shown in Fig. 1. With such construction it will be observed there is no running away of lubricator at the outer end of the bearing; but all the lubricator which flows from the cups passes between the bearing surfaces.

The frame 7 is made movable to bring idler 6 to and from belt-tightening position, and to this end it is conveniently mounted to pivot on a fixed support. As shown, the driving shaft 1 is the fixed support chosen, and the frame is sustained upon an arm or arms (in this case two arms are shown, extending one on either side of pulley 3) and is caused to swing in a circular path of greater radius than drum 3.

Frame 7 is secured to the arms in a manner permitting adjustment of idler 6 in the accuracy of its parallelism with the adjacent portion of belt 5. The frame is bolted to the arms and the bolt holes, or at least one of them, is made elongate as indicated at 11, to the end that the frame may be swung and effect the adjustment indicated.

The pivoting of the arms upon shaft 1 involves further features of invention. The ends of the arms are bifurcated or stirrup-shaped, the fork being of sufficient size to receive the shaft between its prongs, and to permit of the interposition between the prongs and shaft of a bearing member, preferably in the form of a pair of removable shaft-engaging shoes 12. The shaft may at this point be surrounded with a sleeve 13 of suitable anti-friction material. It will be observed that the bearing member is removable, and so in case of breakage or of wear may be replaced; the structure otherwise completely assembled may thus be readily applied laterally to shaft 1, without disturbing pulley 3; and, furthermore, bearing members of different size may be employed, adapting one and the same apparatus to shafts of different diameter.

The whole structure as thus far described is conveniently made of parts which require comparatively little special shaping and machine work, and parts which may readily be knocked down and assembled again; the frame 7, as has appeared, is a simple plate with suitable supports for bearing blocks and with two properly spaced and properly shaped bolt holes.

The arms consist conveniently each of a bolt 10, a surrounding sleeve 14, and a bifurcated member, all spaced and together with the frame 7 assembled in the manner clearly shown in Fig. 1.

As is particularly shown in Fig. 1 the structure is intended to stand by preference (though this need not be the case) in a substantially vertical position, resting primarily on shaft 1. In this substantially vertical position it is at the same time in belt-tightening position; and it is intended to be swung aside (to the left) to release the belt.

An arm for swinging the structure extends angularly from the arm or arms 10, and where there are two arms 10, two such angular arms 16 may be united to form a frame-spanning belt 5 and provided with an operating rod 17 linked to it. A counterweight 18 carrying the center of gravity of the structure as a whole to the right (Fig. 1) and normally holding the structure yieldingly in belt-tightening position may be hung from this angular frame. The frame may be adjustable in its angularity. To this end a bracket 19 is provided, carried rigidly on each arm 10 (or, more exactly, on the sleeve 14 surrounding the bolt 10), and each arm 16 of the angular frame is secured to this bracket at such angle as is desired. Conveniently arm 16 is secured to bracket 19 by being pinned to it at two points and bracket 19 being suitably shaped and provided with a succession of pin holes, the pinning through one or another of such holes will afford the desired adjustment. Such adjustment renders the structure more adaptable to its environment when applied in one or another particular shop.

An abutment, preferably in the form of an idler roller 20, may be mounted to swing with idler 6, being arranged to extend adjacent to and substantially parallel with idler 6 and on the opposite side of belt 5 from idler 6. This idler 20 serves, when the structure is swung to belt-releasing position, to carry the loosened belt to one side and to raise it free or substantially free of engagement with pulley 3. This idler 20 is journaled in suitable arms 21 extending from a convenient part of the structure, as, for example, from arms 10, or, more exactly, from their surrounding sleeves 14.

The applicability and operation are apparent. When the structure is applied to and fitted on a driving shaft, the arms 16 adjusted to proper position and the operating rod connected, the belt 5 is applied. Normally weight 18 will hold the whole structure, pivoted as it is on shaft 1, in the substantially vertical position shown in Fig. 1, where, as will be seen, it is effective to hold belt 5 to driving engagement with pulley 3. The frame 16 may be swung, against the resistance of weight 18 (as by a properly disposed operating rod 17) to carry the structure to the left (Fig. 1) releasing the belt from binding engagement on pulley 3; and in this leftward swing sheave 20, if present, will raise the belt 5 and prevent it from resting of its own weight upon the upper surface of pulley 3.

The adjustability of frame 7 on arms 10 provides for precision of bearing of idler 6 upon the belt; thus any tendency of the belt to slip from its pulley wheel may be overcome and precision of working attained.

I claim as my invention:

1. A belt tightening device including a frame adapted to swing to and fro in a direction transverse to the extent of a machine belt to which it stands adjacent, and a pair of belt engaging abutments mounted in said frame and adapted within the range of the swing of the frame to engage alternately and on opposite sides a belt extending between them.

2. A belt tightener including in its structure a forked shaft-engaging head, a frame carrying a belt-engaging abutment, a spacing sleeve, and a bolt uniting the said head frame and sleeve.

3. A belt tightening device including in combination with a shaft a belt pulley mounted on said shaft and a belt extending over the face of said pulley, an arm extending radially from said shaft and a belt engaging abutment borne by said arm, said arm being counterweighted and by virtue of such counterweighting exerting when in vertical position a lateral thrust upon such belt through its belt engaging member.

4. A belt-tightener including in its structure an arm carrying at one end a belt-engaging abutment and provided at the other end with a shaft seat and a second weighted arm extending angularly from the first and angularly adjustable.

5. A belt-tightener including a roller-supporting frame provided with two bolt-holes spaced at an interval one from the other, one of said bolt holes being an elongate adjustment affording bolt-hole, and a pair of arms to which said frame is bolted, said arms being pivotally applicable to a fixed support.

6. A belt tightening device including in combination with a shaft and a belt pulley mounted on said shaft and a belt extending over the face of said pulley, a pair of arms extending radially from said shaft on either side of the pulley and of the belt thereon, a frame connecting said arms beyond the face of the pulley and extending tangentially, and a belt engaging abutment borne by said tangentially extending frame in a lateral position with respect to said radially extending arms.

In testimony whereof I have hereunto set my hand.

GEORGE C. GOODYEAR.

Witnesses:
FRANCIS J. TOMASSON,
PAUL N. CRITCHLOW.

Copies of this patent may be obtained for five cents each, by addressing the "Commissioner of Patents, Washington, D. C."